US009853862B2

(12) United States Patent
Ranbro (10) Patent No.: US 9,853,862 B2
(45) Date of Patent: Dec. 26, 2017

(54) AUTOMATIC CONFIGURATION OF A REPLACEMENT CAMERA

(71) Applicant: Axis AB, Lund (SE)

(72) Inventor: Mikael Ranbro, Eslöv (SE)

(73) Assignee: Axis AB, Lund (SE)

( * ) Notice: Subject to any disclaimer, the term of this patent is extended or adjusted under 35 U.S.C. 154(b) by 199 days.

(21) Appl. No.: 14/721,668

(22) Filed: May 26, 2015

(65) Prior Publication Data

US 2015/0341210 A1    Nov. 26, 2015

(30) Foreign Application Priority Data

May 26, 2014  (EP) .................................... 14169789

(51) Int. Cl.
*H04L 12/24* (2006.01)
*H04L 29/08* (2006.01)
*G08B 13/196* (2006.01)
*H04N 5/232* (2006.01)
*H04N 7/18* (2006.01)
*H04N 5/247* (2006.01)

(52) U.S. Cl.
CPC .... *H04L 41/0809* (2013.01); *G08B 13/19656* (2013.01); *H04L 41/0886* (2013.01); *H04L 67/125* (2013.01); *H04N 5/23206* (2013.01); *H04N 5/247* (2013.01); *H04N 7/183* (2013.01)

(58) Field of Classification Search
USPC ........................................................ 709/222
See application file for complete search history.

(56) References Cited

U.S. PATENT DOCUMENTS

| 8,184,168 B2* | 5/2012 | Kindborg ......... G08B 13/19671 348/211.11 |
| 8,218,010 B2* | 7/2012 | Ishii ................ G08B 13/19682 340/541 |
| 9,277,174 B2* | 3/2016 | Yamahara ................ H04N 5/77 |
| 2004/0250072 A1 | 12/2004 | Ylonen |
| 2006/0171453 A1 | 8/2006 | Rohlfing et al. |
| 2007/0116458 A1 | 5/2007 | McCormack |
| 2011/0267464 A1 | 11/2011 | Archer et al. |

(Continued)

FOREIGN PATENT DOCUMENTS

| EP | 2 511 887 A1 | 4/2011 |
| GB | 2 363 023 A | 12/2011 |

(Continued)

OTHER PUBLICATIONS

Japanese Patent Application No. 2015-100284 Office Action dated Sep. 27, 2016.

(Continued)

*Primary Examiner* — Jude Jean Gilles
(74) *Attorney, Agent, or Firm* — Volpe and Koenig, P.C.

(57) ABSTRACT

There is provided a method for configuration of a camera which is a replacement for one of a plurality of cameras in a network. The method comprises inter alia detecting that a new camera has connected to the network; determining that the new camera is a replacement for a particular camera among one or more candidate cameras if property data of the new camera matches property data of the particular camera; and configuring the new camera based on configuration settings corresponding to the particular camera.

13 Claims, 3 Drawing Sheets

(56) References Cited

U.S. PATENT DOCUMENTS

2012/0198100 A1    8/2012  Tsang et al.
2014/0267745 A1*   9/2014  Martin .................. H04N 7/181
                                                        348/159

FOREIGN PATENT DOCUMENTS

| JP | 2004096580 A2 | 3/2004 |
| JP | 2005-012518 A | 1/2005 |
| JP | 2007-043390 A | 2/2007 |
| JP | 2008085776 A2 | 4/2008 |
| JP | 2010021920 A2 | 1/2010 |
| JP | 2012-235355 A2 | 11/2012 |
| TW | 201216694 A | 4/2012 |

OTHER PUBLICATIONS

IQmanager product literature (downloaded Mar. 25, 2014).
AXIS Camera Management product literature (2905/EN/R4/0703).
EP 14 16 9789 European Search Report dated Nov. 21, 2014.
ROC (Taiwanese) Patent Application No. 104113987 Search Report dated Apr. 19, 2017.

\* cited by examiner

AUTOMATIC CONFIGURATION OF A REPLACEMENT CAMERA

BACKGROUND

The present invention relates to the field of camera configuration. In particular, it relates to configuration of a camera which is a replacement for one of a plurality of cameras in a network.

Camera networks have become popular, e.g. for surveillance purposes. Setting up and maintaining such camera networks can be quite demanding in that the cameras need to be correctly configured. A particular situation which may occur when maintaining a camera network is that a faulty camera has to be replaced by a new one. Upon such replacement, the replacement camera needs to be configured.

Conventionally, the configuration of the cameras has been performed manually, regardless of whether it has concerned updating the configuration of an existing camera in the network, adding a new camera to the network, or replacing an existing camera in the network by a replacement camera.

US 2011/0267464 A1 discloses methodology which may be used to partly automate the configuration procedure. In more detail, a video monitoring network which comprises a platform for setting up and reconfiguring remote installations is disclosed. The platform stores a profile for each remote installation which may be used in order to enable automatic configuration of the hardware of the remote installation. As a new remote installation is commissioned, the user selects the equipment that will be installed and the location for the installation. The user may then access the platform in order to set up the remote installation, e.g. by defining monitoring regimes for the camera or defining alerts and alarm events.

Thus, also with this approach, the user has to manually input relevant configuration parameters. Moreover, the disclosed methodology does not concern configuration of replacement cameras.

There is thus a need for a method which automates the configuration of a replacement camera, thereby saving time for the maintenance staff.

SUMMARY

In view of the above, it is thus an object of the present invention to provide an efficient method and associated arrangements for configuration of a replacement camera.

According to a first aspect of the invention, the above object is achieved by a method for configuration of a camera which is a replacement for one of a plurality of cameras in a network, comprising the steps of:

detecting that a new camera has connected to the network;
receiving property data of the new camera;
accessing, from the network, property data of one or more candidate cameras among the plurality of cameras;
determining that the new camera is a replacement for a particular camera among the one or more candidate cameras if the property data of the new camera matches the property data of the particular camera;
accessing configuration settings corresponding to the particular camera, of which the new camera is a replacement, from the network; and configuring the new camera based on the configuration settings corresponding to the particular camera.

It may be desirable to configure a replacement camera using similar configuration settings that were used for the camera being replaced. For example, it may be desirable to have the same imaging settings, such as white balance and focus, the same settings for event and alarm handling, the same settings for preset positions and particular sweeps of the camera, the same settings for position and viewing direction etc. The inventive method thus allows a replacement camera to be automatically configured based on the configuration settings of the camera which is replaced. This is made possible since the configuration settings of the cameras in the network are accessible and the method allows automatic determination that a new camera which connects to the network is a replacement camera for one of the cameras in the network. The automatic determination of a replacement camera is based on the fact that a replacement camera typically has properties which match the properties of the camera it is replacing. For example, the view of the cameras may be similar, the geographical position of the cameras may be similar, and the camera type and camera model may be similar.

With the proposed method, the configuration of the replacement camera may thus be fully, or at least almost fully, automated, thereby saving time for the maintenance staff.

The step of determining that the new camera is a replacement for a particular camera among the plurality of cameras in the network may comprise: comparing the property data of the new camera with property data of the one or more candidate cameras so as to determine if the property data of the new camera matches the property data of a particular camera among the one or more candidate cameras. For example, in case of numerical values of the properties, such as a coordinate of a geographical position, the comparison may include forming differences between the property data of the new camera and the property data of the one or more candidate cameras. In case of non-numerical values, such as if the property is a camera model, the comparison may comprise assigning a Boolean variable (i.e. TRUE or FALSE) depending on whether two properties are the same or not.

Further, the step of comparing the property data of the new camera with property data of the one or more candidate cameras may comprise applying weights to the properties described by the property data. For example, different weights may be applied to different properties, such that some properties are allowed to be more decisive in the comparison. This may for instance be used to form a weighted sum of the differences or Boolean variables representing the result of the comparison of the property data.

The one or more candidate cameras may be all cameras in the network. However, for computationally efficiency only a subset of the cameras may be used as candidate cameras. The decision regarding which cameras in the network are possible candidate cameras may be based on the current status of the cameras. For example, the one or more candidate cameras may comprise cameras which currently are off-line from the network. This choice of candidate cameras is advantageous since a camera which has been replaced is typically off-line.

The method may further be performed in a hierarchical fashion. To start with, only a subset of the cameras, such as the currently off-line cameras, may be considered as candidate cameras. If it is found that the new camera is not a replacement for any of the cameras in the subset, a larger set of cameras, such as all cameras, may be considered as candidate cameras. This approach is advantageous in that it in the long run will be computationally efficient.

In the process of determining that the new camera is a replacement for a particular candidate camera, a score may be assigned to each of the one or more candidate cameras based on a comparison of the property data of the new camera with the property data of the candidate camera. The score may reflect a probability that the new camera is a replacement for the candidate camera. The scores may be used in order to determine if the property data of the new camera matches the property data of a particular camera among the one or more candidate cameras.

By assigning scores, the process of determining if the property data of the new camera matches the property data of a particular camera among the one or more candidate cameras is simplified. Moreover, since the scores reflect probabilities, the certainty (and uncertainty) of the determination may be taken into account. Thus, the method may not only deliver a result of which among the candidate cameras is the most likely camera but also give a measure about how certain that result is.

For example, it may be determined that the property data of the new camera matches the property data of the particular camera among the one or more candidate cameras if the score assigned to the particular camera is higher than a first threshold and the difference between the score assigned to the particular camera and the score of any other candidate camera is higher than a second threshold. In this way, a candidate camera is only determined to be a camera which is replaced by the new camera if its score is higher than a first threshold, i.e. the probability of being replaced must be high enough. However, it is not enough that the score exceeds the first threshold. For example, there may be two candidate cameras having scores which exceed the first threshold. In such a situation, the method should only appoint the camera having the highest score if the score differs from the score of the other cameras by an amount which is larger than a second threshold. In this way, one may exclude that a camera is appointed if there are several cameras having almost the same score.

The step of configuring the new camera may comprise transferring the configuration settings corresponding to the particular camera to the new camera. Additionally or alternatively, the configuration settings corresponding to the particular camera may be used to update a database with respect to the new camera.

The method may further comprise receiving a user input which confirms that the new camera is a replacement for the particular camera prior to the step of configuring the new camera based on the configuration settings corresponding to the particular camera. In this way, a user has the chance of checking and confirming whether the replaced camera has been correctly identified.

The method may further comprise adjusting the configuration settings corresponding to the particular camera based on the property data of the new camera and the property data of the particular camera prior to the step of configuring the new camera. In this way, the method may e.g. ensure that the settings are translated according to relative differences in certain parameters. For example, if the new camera is slightly rotated compared to the replaced camera, a rotation parameter of the new camera may be set to compensate for the difference. The method could also use image analysis (edge detection) to adjust the view to as resemble the replaced one as closely as possible. It could also be the case that the new camera replaces a very old camera and that the configuration settings of the old camera for that reason are not directly applicable to the new camera and therefore need to be adjusted.

The property data generally refers to properties of the cameras. Such data may for example be comprised in and accessed from the network, a database, or directly from a camera. The property data may comprise parameters which are indicative of at least one of a view and a functionality of the concerned camera.

Examples of parameters which are indicative of a view of the concerned camera comprise at least one of a geographical position, a viewing direction, and a field of view of the concerned camera. The geographical position may e.g. be a longitude/latitude coordinate, a room of a building, or even an identification of the socket to which the camera is connected. By comparing parameters which are indicative of a view from two cameras one may thus check whether the two cameras are viewing the same scene.

Examples of parameters which are indicative of a functionality of the concerned camera comprise at least one of a camera model, a camera type, and a camera capability. A camera type may for example be a fixed camera, a pan-tilt-zoom camera, a dome camera etc. A camera capability may e.g. refer to specific functionality of the camera, such as is the camera is capable of identifying license plates, or faces. By comparing parameters which are indicative of functionalities of two cameras, one may thus check whether the two cameras are intended for the same purposes.

Of the above parameters, the geographical position may typically be given the highest weight.

According to a second aspect of the invention, the above object is achieved by a computer program product comprising a computer-readable medium with instructions for performing the method of any one of the preceding claims. The computer-readable medium may be a non-transitory computer-readable medium.

According to a third aspect of the invention, there is provided an arrangement for configuration of a camera which is a replacement for one of a plurality of cameras in a network, comprising:

a camera detection component configured to detect that a new camera has connected to the network;

a receiving component configured to receive property data of the new camera;

a data accessing component configured to access, from the network, property data of one or more candidate cameras among the plurality of cameras;

a camera matching component configured to determine that the new camera is a replacement for a particular camera among the one or more candidate cameras if the property data of the new camera matches the property data of the particular camera;

the data accessing component being further configured to access configuration settings corresponding to the particular camera, of which the new camera is a replacement, from the network; and a configuration component arranged to configure the new camera based on the configuration settings corresponding to the particular camera.

At least one of the camera detection component, the receiving component, the data accessing component, the camera matching component, and the configuration component is distributed over the plurality of cameras in the network.

According to a fourth aspect of the invention, there is provided camera network comprising:

a plurality of cameras which are inter-connected;

a data storage connected to the plurality of cameras and configured to store backup copies of property data and configuration settings of the plurality of cameras; and an arrangement according the third aspect for configuration of a camera which is a replacement for one of the plurality of cameras in the camera network.

The second, third, and fourth aspects may generally have the same features and advantages as the first aspect. It is further noted that the invention relates to all possible combinations of features unless explicitly stated otherwise.

Generally, all terms used in the claims are to be interpreted according to their ordinary meaning in the technical field, unless explicitly defined otherwise herein. All references to "a/an/the [device, event, message, alarm, parameter, step etc.]" are to be interpreted openly as referring to at least one instance of said device, event, message, alarm, parameter, step etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF THE PREFERRED EMBODIMENTS

The present invention will now be described more fully hereinafter with reference to the accompanying drawings, in which embodiments of the invention are shown. The systems and devices disclosed herein will be described during operation.

Figure 1:
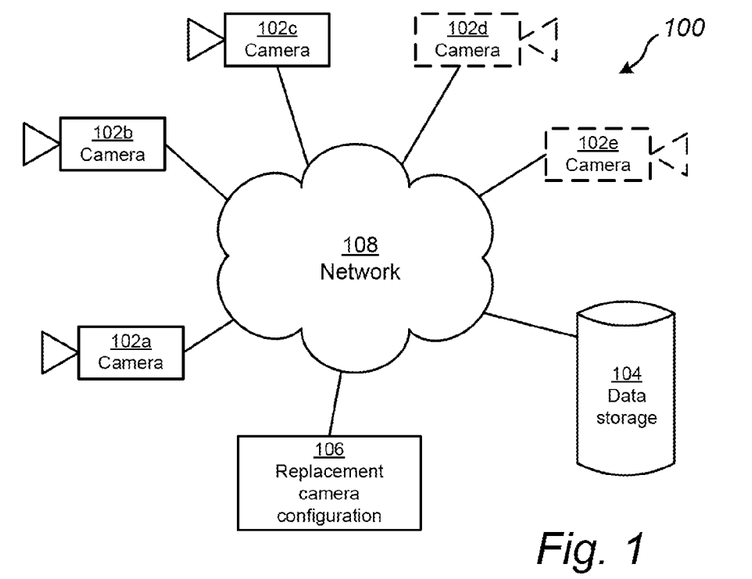
FIG. 1 schematically illustrates a camera network according to embodiments of the invention.

FIG. 1 illustrates a camera network 100. The camera network 100 comprises a plurality of cameras 102a-e, a data storage 104, an arrangement for configuration of a camera which is a replacement for one of the plurality of cameras 102a-e in the network 100, and a network 108 via which the different parts are operatively inter-connected.

The cameras 102a-e may be either on-line, i.e. currently connected to the network 108, or off-line, i.e. currently disconnected from the network 108. In the illustrated example, cameras 102a-c are on-line and cameras 102d-e are off-line as indicated by the dashed lines.

The cameras 102a-e are associated with property data. The property data describes basic properties of the cameras 102a-e. For example, the property data may comprise parameters which are indicative of the view of the camera 102a-e, such as the geographical position, the viewing direction, and the field of view of the camera 102a-c. The parameters which are indicative of the view of the camera 102a-e may also comprise an image captured by the camera 102a-e.

The property data may further comprise parameters which are indicative of the functionality of the camera 102a-e, such as the camera model, the camera type, and the capabilities of the camera.

Cameras 102a-e are further associated with configuration settings. The configuration settings comprise settings which control the operation of the camera 102a-e. For example, the configuration settings may comprise imaging settings, such as white balance, focus, etc., which relates to the appearance of images captured by the camera. The configuration settings may further include different profiles of e.g. imaging settings to be used in different modes of the camera 102a-e. For instance, there may be a day mode and a night mode having corresponding day and night profiles defining the imaging settings to be used during day time and night time, respectively. In association with the different modes, the configuration settings may further comprise settings which define when the different modes are to be used, such as the time of the day the camera 102a-e is to switch from night mode to day mode and vice versa. Other examples of configuration settings are presets which define different preset positions that the camera 102a-e often use, "guard tours" which define different sweeps of the camera 102a-e to be carried out at certain occasions, settings for event handling such as alarms, settings for motion detection and settings for image processing.

The configuration settings may also comprise basic physical properties of the camera 102a-e such as IP-address, position, viewing angle, and direction of the camera 102a-e.

In this respect, it is to be noted that some of the parameters of the property data may be configurable. For that reason, there may thus be an overlap between the property data and the configuration settings. For example, in some cases one may choose to stream image data from only a portion of the image sensor of the camera 102a-e instead of the whole image. In such a case, the viewing angle is configurable and also the direction, at least to some extent. Other parameters of the property data are, for natural reasons, fixed, such as the camera model, the form factor, and sensor resolution.

A backup copy of the property data and the configuration settings are stored in the camera network 100. For example, the property data and the configuration settings may be stored in a data storage 104. As illustrated, the data storage 104 may be a central data storage, such as a database, accessible via the network 108. Alternatively, or additionally, the data storage 104 may be distributed over the plurality of cameras 102a-e, such that the cameras 102a-e store backup data for each other. Storing or updating of backup copies may be triggered by a change in a parameter value of one of the cameras 102a-e. In this way, when a camera 102a-e is out of order, there is a backup of the property data and configuration settings somewhere else in the camera network 100.

Figure 2:
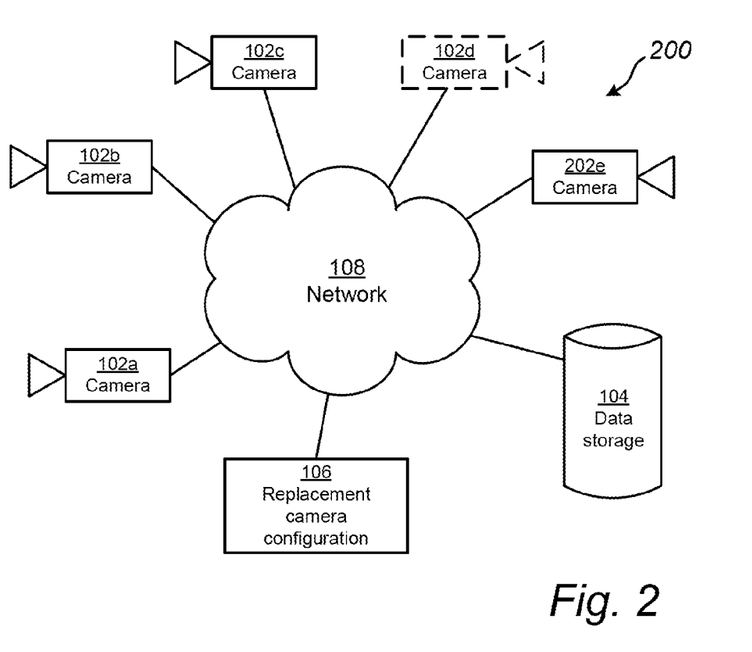
FIG. 2 schematically illustrates the camera network of FIG. 1 wherein one of the cameras is replaced by a new camera.

FIG. 2 illustrates a camera network 200 corresponding to the camera network 100 of FIG. 1. In the camera network 200, the camera 102e has been replaced by a replacement camera 202e, e.g. due to the camera 102e being out or order.

The arrangement 106 is provided for configuration of a camera which is a replacement for one of the plurality of cameras 102a-e, such as camera 202e which replaces camera 102e. The arrangement 106 may be provided as a separate unit, as illustrated, or may be distributed over the plurality of cameras 102a-e. Combinations thereof are also possible such that some components (representing functionalities) of the arrangement 106 are distributed over the plurality of cameras 102a-e and some components are provided in a separate unit.

Figure 3:
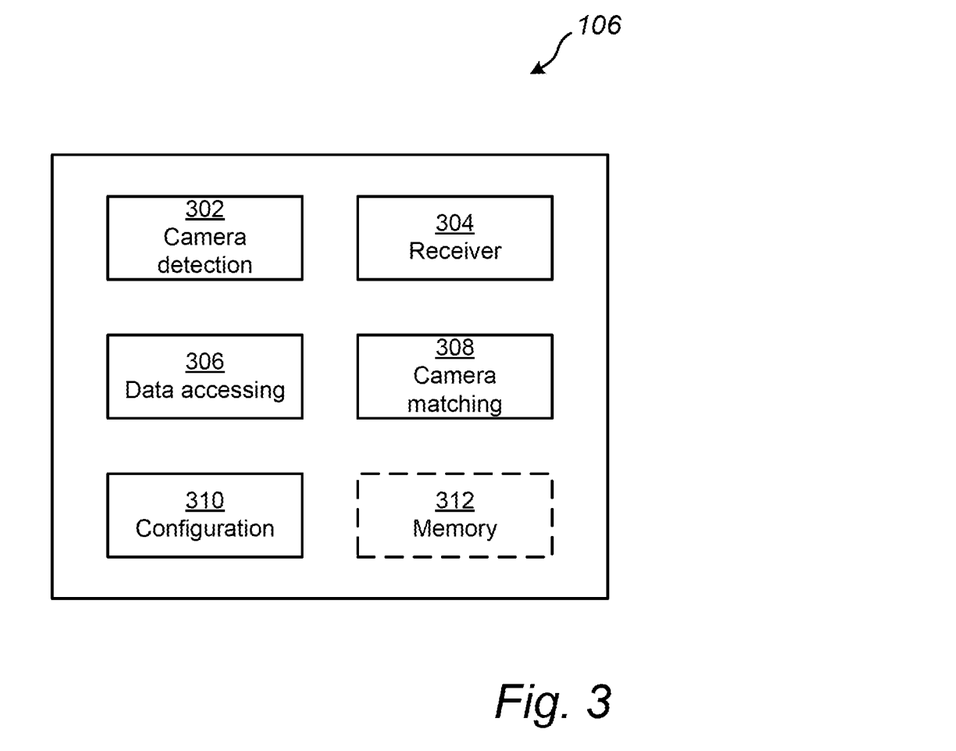
FIG. 3 schematically illustrates an arrangement for configuration of a camera which is a replacement camera for one of a plurality of cameras in a network according to embodiments.

FIG. 3 illustrates components of the arrangement 106. The arrangement 106 comprises a camera detection component 302, a receiving component 304, a data accessing component 306, a camera matching component 308, and a configuration component 310. The arrangement 106 may further comprise a memory 312.

The different components of the arrangement 106 may be implemented in software or in hardware. In the former case, the arrangement 106 may comprise a processing unit and the memory 312 may serve as a (non-transitory) computer-readable medium with computer instructions which may be carried out by the processing unit in order to implement the functionality of the different components of the arrangement 106.

Figure 4:
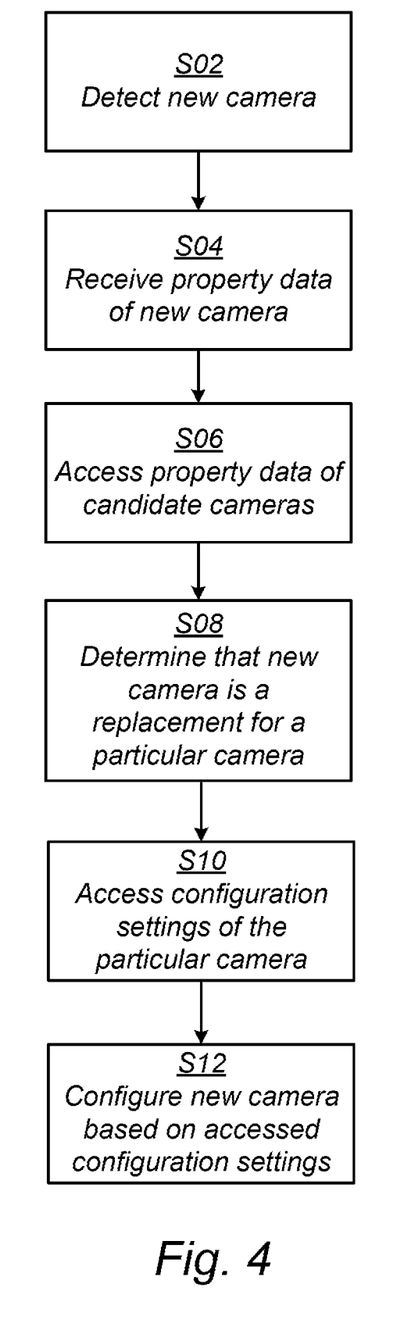
FIG. 4 is a flowchart of a method for configuration of a camera which is a replacement for one of a plurality of cameras in a network.

The operation of the arrangement 106 upon replacement of the camera 102e by camera 202e will now be described with reference to FIGS. 1-3 and the flow chart of FIG. 4.

In step S02, the camera detection component 302 detects that a new camera, i.e. camera 202e, has connected to the network 108. As the new camera 202e connects to the network it may e.g. send out a multicast message to a predefined address, e.g. in accordance with the Simple Service Discovery Protocol (SSDP). The camera detection component 302 may listen for such multicast messages, thereby detecting that a new camera has connected to the network 108.

In step S04, the receiving component 304 receives property data of the new camera 202e. The property data may be received directly from the camera 202e. Alternatively, for example if the arrangement 106 does not have direct access to the camera 202e via the network 108, the property data of the new camera 202e may be retrieved from a database, such as data storage 104.

In step S06 the data accessing component 306 accesses property data of one or more candidate cameras 102d-e among the plurality of cameras 102a-e. In some cases, all cameras 102a-e in the camera network 100 are candidate cameras. However, in order to make the method more computationally efficient, the one or more candidate cameras 102d-e may be a subset of the plurality of cameras 102a-e. Typically, as in the illustrated example, the one or more candidate cameras 102d-e are those cameras which currently are off-line from the network 108 since a camera 102a-e which is replaced is likely to be off-line.

The property data of the one or more candidate cameras 102d-e is accessed from the camera network 100, 200. As discussed above, backup copies of the property data may either be stored in the plurality of cameras 102a-e or in the separate data storage 104 connected to the network 108.

On basis of the property data of the new camera 202e and the one or more candidate camera 102d-e, the camera matching component 308 in step S08 makes a decision whether the new camera 202e is a replacement for a particular camera 102e among the one or more candidate cameras 102d-e. In more detail, the camera matching component 308 determines that the new camera 202e is a replacement for a particular camera 102e if the property data of the new camera 202e matches that of the particular camera 102e. For this purpose, the camera matching component 308 may compare the property data of the new camera 202e with the property data of the candidate cameras 102d-e. Both parameters which are indicative of the view of the cameras as well as parameters which are indicative of the functionality of the camera may be taken into account in the comparison.

When making the comparison, different properties may be given different importance. More specifically, different weights may be applied to the properties. For instance, the parameters which are indicative of the view of the cameras, and in particular the position of the cameras, may be given a higher weight than the other properties. The reason for this is that it is believed that if two cameras have the same or a similar view one of the cameras is likely a replacement for the other camera. Moreover, the weights may be chosen on basis of the particular installation environment, such as if the camera network 100, 200 is installed in a transportation environment (buses, trains), a retail environment, or in a city surveillance environment. In other words, depending on the installation environment different properties may be relevant. For instance, if the camera network 100, 200 is installed in a train, the GPS coordinate of the cameras 202e, 102a-e may be less important since the geographical position of the cameras changes as the train moves along.

When making the comparison, the camera matching component 308 may assign different scores to the candidate cameras 102d-e. The scores may take values in different ranges. However, preferably, the scores reflect the probability that the new camera 202e is a replacement for the candidate camera 102d-e. By way of example, camera 102d may be given the score 0.1, and the camera 102e may be given the score 0.85.

Based on the scores, the camera matching component 308 may make a decision that the property data of the new camera 202e matches the property data of a particular camera 102e among the candidate cameras 102a-f. If the score of the particular camera 102e is high enough, and there is only a single camera among the candidate cameras 102d-e that rated that high, it is determined that a replacement has occurred. This procedure may be implemented by comparing the scores to some thresholds. In more detail, if the score assigned to a particular camera 102e is higher than a first threshold, and the difference between the score of the particular camera 102e and the score of any other candidate camera 102d is higher than a second threshold, the camera matching component 308 determines that there is a match in the property data. By way of example, the first threshold may be 0.8 and the second threshold may be 0.5. With these values of the thresholds, the score 0.85 of camera 102e exceeds the first threshold, and the difference between the scores of cameras 102e and 102d, being equal to 0.75, exceeds the second threshold. Thus, the camera matching component 308 will in that case determine that the new camera 202e is a replacement for the camera 102e.

In some embodiments, the camera matching component 308 may output a request to a user to confirm that the detected replacement is correct. In the illustrated example, a user would hence be requested to confirm that camera 202e is a replacement camera for camera 102e. In response to the request, the camera matching component 308 may receive user input which confirms that the new camera 202e is a replacement for the particular camera 102e.

Next, the configuration component 310 in step S10 accesses configuration settings of the particular camera 102e which has been replaced. The configuration settings are accessed from the network 100, 200. As discussed above, backup copies of the configuration settings may either be stored in the plurality of cameras 102a-e or in the separate data storage 104.

The configuration component 310 then configures the new camera 202e based on the configuration settings corresponding to the camera 102e which is replaced. In some embodiments, the configuration component 310 stores the configuration settings, e.g. in the data storage 104, for later use. In other embodiments, the configuration component 310 imports the configuration settings into the new camera 202e. In more detail, the configuration component 310 may transfer the configuration settings to the new camera 202e.

In some cases, the configuration settings of the camera 102e being replaced are not directly compatible with the configurations settings of the new camera 202e. For example, the new camera 202e may be of a newer model, or there may be a relative difference in some properties of the cameras, such as if the new camera 202e is rotated compared to the old camera 102e. In such case, prior to configuring the new camera 202e, the configuration component 310 may adjust, i.e. translate, the configuration settings of the old camera 102e based on the property data of the new camera 202e and the property data of the old camera 102e. For example, the configuration component 310 may find a difference between the directions (i.e. the rotations) of the cameras on basis of the property data and set a rotation parameter in the new camera 202e to compensate for the difference. According to another example, there may be a difference in the position of the new camera 202e in comparison to the old camera 102e, and the coordinates of e.g. the preset positions may be adjusted based on the difference. In case the property data also comprises an image captured by the old camera 102e, the configuration component 310, could also use image analysis, such as edge detection, to adjust the view of the new camera 202e to as closely as possible resemble the replaced one. Moreover, image settings could be adjusted based on image analysis. For example, the white balance or focal length of the new camera 202e could be adjusted in this way.

It will be appreciated that a person skilled in the art can modify the above-described embodiments in many ways and still use the advantages of the invention as shown in the embodiments above. Thus, the invention should not be limited to the shown embodiments but should only be defined by the appended claims. Additionally, as the skilled person understands, the shown embodiments may be combined.

What is claimed is:

1. A method for configuration of a camera which is a replacement for one of a plurality of cameras in a network, comprising:
   detecting that a new camera has connected to the network;
   receiving property data of the new camera;
   accessing, from the network, property data of one or more candidate cameras among the plurality of cameras;
   determining that the new camera is a replacement for a particular camera among the one or more candidate cameras if the property data of the new camera matches the property data of the particular camera;
   accessing configuration settings corresponding to the particular camera, of which the new camera is a replacement, from the network, the configuration settings being settings for controlling the operation of the camera; and
   configuring the new camera based on the configuration settings corresponding to the particular camera,
   wherein the property data of an camera comprises at least one from the list of: a coordinate of a geographical position of the camera, a camera model, a camera type, and a camera capability.

2. The method of claim 1, wherein the determining that the new camera is a replacement for a particular camera among the plurality of cameras in the network comprises:
   comparing the property data of the new camera with property data of the one or more candidate cameras so as to determine if the property data of the new camera matches the property data of a particular camera among the one or more candidate cameras.

3. The method of claim 2, wherein the step of comparing the property data of the new camera with property data of the one or more candidate cameras comprises applying weights to the properties described by the property data.

4. The method of claim 1, wherein said one or more candidate cameras comprise cameras which currently are off-line from the network.

5. The method of claim 1, further comprising:
   assigning a score to each of the one or more candidate cameras based on a comparison of the property data of the new camera with the property data of the candidate camera, wherein the score reflects a probability that the new camera is a replacement for the candidate camera, and the scores are used in order to determine if the property data of the new camera matches the property data of a particular camera among the one or more candidate cameras.

6. The method of claim 5, wherein it is determined that the property data of the new camera matches the property data of the particular camera among the one or more candidate cameras if the score assigned to the particular camera is higher than a first threshold and the difference between the score assigned to the particular camera and the score of any other candidate camera is higher than a second threshold.

7. The method of claim 1, wherein the configuring the new camera comprises transferring the configuration settings corresponding to the particular camera to the new camera.

8. The method of claim 1, further comprising adjusting the configuration settings corresponding to the particular camera based on the property data of the new camera and the property data of the particular camera prior to the step of configuring the new camera.

9. The method of claim 1, further comprising:
   receiving a user input which confirms that the new camera is a replacement for the particular camera prior to the step of configuring the new camera based on the configuration settings corresponding to the particular camera.

10. A non-transitory computer-readable storage medium having processor-executable instructions stored thereon which, when executed by at least on processor, will cause the at least one processor to perform a method for configuration of a camera which is a replacement for one of a plurality of cameras in a network, the method comprising:
    detecting that a new camera has connected to the network;
    receiving property data of the new camera;
    accessing, from the network, property data of one or more candidate cameras among the plurality of cameras;
    determining that the new camera is a replacement for a particular camera among the one or more candidate cameras if the property data of the new camera matches the property data of the particular camera;
    accessing configuration settings corresponding to the particular camera, of which the new camera is a replacement, from the network, the configuration settings being settings for controlling the operation of the camera; and
    configuring the new camera based on the configuration settings corresponding to the particular camera,
    wherein the property data of a camera comprises at least one from the list of: a coordinate of a geographical position of the camera, a camera model, a camera type, and a camera capability.

11. An arrangement for configuration of a camera which is a replacement for one of a plurality of cameras in a network, comprising:
- a camera detection component configured to detect that a new camera has connected to the network;
- a receiving component configured to receive property data of the new camera;
  - a data accessing component configured to access, from the network, property data of one or more candidate cameras among the plurality of cameras;
- a camera matching component configured to determine that the new camera is a replacement for a particular camera among the one or more candidate cameras if the property data of the new camera matches the property data of the particular camera;
- the data accessing component being further configured to access configuration settings corresponding to the particular camera of which the new camera is a replacement, from the network, the configuration settings being settings for controlling the operation of the camera; and
- a configuration component arranged to configure the new camera based on the configuration settings corresponding to the particular camera,
- wherein the property data comprises at least one from the list of: a coordinate of a geographical position of the camera, a camera model, a camera type, and a camera capability.

12. The arrangement of claim 11, wherein at least one of the camera detection component, the receiving component, the data accessing component, the camera matching component, and the configuration component is distributed over the plurality of cameras in the network.

13. A camera network comprising:
- a plurality of cameras which are inter-connected;
- a data storage connected to the plurality of cameras and configured to store backup copies of property data and configuration settings of the plurality of cameras; and
- an arrangement for configuration of a camera which is a replacement for one of the plurality of cameras in the camera network comprising:
  - a camera detection component configured to detect that a new camera has connected to the network;
  - a receiving component configured to receive property data of the new camera;
  - a data accessing component configured to access, from the network, property data of one or more candidate cameras among the plurality of cameras;
  - a camera matching component configured to determine that the new camera is a replacement for a particular camera among the one or more candidate cameras if the property data of the new camera matches the property data of the particular camera;
  - the data accessing component being further configured to access configuration settings corresponding to the particular camera of which the new camera is a replacement, from the network, the configuration settings being settings for controlling the operation of the camera; and
  - a configuration component arranged to configure the new camera based on the configuration settings corresponding to the particular camera,
  - wherein the property data comprises at least one from the list of: a coordinate of a geographical position of the camera, a camera model, a camera type, and a camera capability.

* * * * *

UNITED STATES PATENT AND TRADEMARK OFFICE
CERTIFICATE OF CORRECTION

PATENT NO. : 9,853,862 B2  
APPLICATION NO. : 14/721668  
DATED : December 26, 2017  
INVENTOR(S) : Mikael Ranbro Page 1 of 1

It is certified that error appears in the above-identified patent and that said Letters Patent is hereby corrected as shown below:

In the Claims

In Claim 10, at Column 10, Line 45, after the words "at least", delete "on" and insert therefor --one--.

Signed and Sealed this  
Twenty-sixth Day of February, 2019

Andrei Iancu  
*Director of the United States Patent and Trademark Office*